United States Patent [19]
Mori et al.

[11] Patent Number: 4,636,641
[45] Date of Patent: Jan. 13, 1987

[54] RADIATION IMAGE READ-OUT METHOD AND APPARATUS

[75] Inventors: Nobufumi Mori; Kenji Takahashi; Kazuo Horikawa, all of Kanagawa, Japan

[73] Assignee: Fuji Photo Film Co., Ltd., Kanagawa, Japan

[21] Appl. No.: 558,241

[22] Filed: Dec. 5, 1983

[30] Foreign Application Priority Data

Dec. 8, 1982 [JP] Japan ................... 57-215318

[51] Int. Cl.$^4$ .................... G03G 5/16; H05B 33/00
[52] U.S. Cl. ........................ 250/327.2; 250/484.1
[58] Field of Search ................ 250/327.2, 484.1, 337

[56] References Cited

U.S. PATENT DOCUMENTS 4,044,261  8/1977  Wilson ........................... 250/369
4,489,236 12/1984  Outhwaite ..................... 250/252.1

Primary Examiner—Alfred E. Smith
Assistant Examiner—Richard Hanig
Attorney, Agent, or Firm—Sughrue, Mion, Zinn, Macpeak, and Seas

[57] ABSTRACT

A stimulable phosphor sheet carrying a radiation image stored therein is scanned with stimulating rays which cause the stimulable phosphor sheet to emit light in proportion to the radiation energy stored therein. The emitted light is photoelectrically detected to obtain sequential electric signals of respective picture elements of the radiation image. The interference among the electric signals of the respective picture elements which is caused by the light emission response characteristics of the stimulable phosphor to the stimulation is eliminated electrically. The correction is conducted by adding a differentiated value of the sequential electric signals of the respective picture elements to the sequential electric signal of the respective picture elements.

6 Claims, 3 Drawing Figures

RADIATION IMAGE READ-OUT METHOD AND APPARATUS

BACKGROUND OF THE INVENTION

1. Field of the Invention

This invention relates to a method of accurately reading out a radiation image at high speeds from a stimulable phosphor carrying the radiation image stored therein, and an apparatus for carrying out the method.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted from the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

This radiation image system using the stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored in the phosphor varies over a very wide range in proportion to the amount of energy stored therein, it is possible to obtain an image having desired density regardless of the amount of exposure of the phosphor to the radiation by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

In the aforesaid radiation image recording and reproducing system, the read-out step for reading out the radiation image from the stimulable phosphor sheet carrying the radiation image stored therein is typically conducted by two-dimensionally scanning the stimulable phosphor sheet with a light beam such as a laser beam which causes it to emit light in proportion to the stored energy of the radiation, and sequentially detecting the emitted light and converting it into an image signal by use of a photodetector such as a photomultiplier.

As described above, when the stimulable phosphor carrying the radiation energy stored therein is exposed to stimulating rays, the stimulable phosphor releases the stored radiation energy as light emission. The intensity of the light emission rises to near maximum level quickly (for example, in several nanoseconds) after the exposure of the stimulable phosphor to the stimulating rays is started, and thereafter decreases gradually. Even after the exposure to the stimulating rays is finished, the light emission continues as after-glow for a period corresponding to the response time intrinsic to the stimulable phosphor. Therefore, when the stimulable phosphor sheet is scanned with the stimulating rays and the light sequentially emitted from the stimulable phosphor sheet is photoelectrically detected, not only the light component emitted from the picture element currently being exposed to the stimulating rays but also the after-glow components emitted from the picture elements which have already been exposed to the stimulating rays are detected as the radiation image component of the picture element currently being exposed to the stimulating rays. As a result, discrimination of the signals among the picture elements is not attained completely, and the sharpness of the visible image reproduced by use of the signals detected as described above becomes low. In the detection of the intensities of light emitted from a plurality of picture elements of a radiation image, the resolution among the picture elements is decreased as the scanning speed of the stimulating rays is increased and as the response time of the stimulable phosphor becomes longer. Accordingly, in the case where a stimulable phosphor exhibiting slow response to stimulation (i.e. a stimulable phosphor exhibiting long after-glow) is used or the scanning speed of the stimulating rays is increased, the sharpness of the image becomes low and it becomes impossible to obtain a visible radiation image having a high image sharpness satisfactory for practical use.

Since there is desired a read-out apparatus which can quickly process many stimulable phosphor sheets, that is, a read-out apparatus having a high read-out speed (scanning speed), and since there is substantively a limit to the shortening of the response time of the stimulable phosphor that can realized by improvement of the stimulable phosphor, a need exists for a method of eliminating the lowering of the sharpness of the radiation image which is essentially attributable to the response characteristics of the stimulable phosphor.

SUMMARY OF THE INVENTION

The primary object of the present invention is to provide a radiation image read-out method which eliminates the decrease of the sharpness of a radiation image essentially caused by the response characteristics of the stimulable phosphor to the stimulation.

Another object of the present invention is to provide a radiation image read-out method which realizes a high read-out speed and still provides a radiation image having an improved image quality, particularly a high diagnostic efficiency and accuracy.

The specific object of the present invention is to provide an apparatus for carrying out the radiation image read-out method.

The present invention provides a method of reading out a radiation image in which a stimulable phosphor sheet carrying the radiation image stored therein is scanned with stimulating rays which cause the stimulable phosphor sheet to emit light in proportion to the radiation energy stored therein, and the emitted light is photoelectrically detected to obtain sequential electric signals of respective picture elements of the radiation image, wherein the improvement comprises electrically eliminating the interference among said electric signals of the respective picture elements which is caused by the light emission response characteristics of said stimulable phosphor to said stimulating rays.

In the present invention, it is possible to eliminate the decrease of the sharpness of a radiation image which is substantially caused by the light emission response characteristics of the stimulable phosphor to the stimulating rays. Moreover, it becomes possible to obtain a radiation image having an improved image quality, particularly a high diagnostic efficiency and accuracy. It also becomes possible to realize a read-out apparatus having a high read-out speed.

In the present invention, the level of the signal of the picture element at a point from which light is emitted upon stimulation is corrected. Namely, from the signal of a certain picture element among the sequential signals obtained by photoelectrically reading out the radiation image stored in the stimulable phosphor sheet, the after-glow components of the picture elements scanned with the stimulating rays prior to the aforesaid picture element are substantially removed electrically.

By "light emission response characteristics" is meant a change with time of the intensity of light emission after the stimulable phosphor is exposed to the stimulating rays. In general, since the intensity of light emission very quickly reaches the maximum after the exposure to the stimulating rays is started, the important factor of the light emission response characteristics is how the after-glow decays (i.e. the pattern of the sequential change in the intensity of the after-glow).

In general, scanning of the stimulable phosphor sheet with the stimulating rays is conducted by continuously moving a light beam having a predetermined beam diameter, and the time of exposure of a point on the stimulable phosphor sheet to the stimulating rays is defined by the time elapsing from when the stimulating rays start impinging upon the aforesaid point to when the impinging of the stimulating rays thereupon is finished. Therefore, the exposure time at the aforesaid point is determined by the scanning speed of the stimulating rays and the beam diameter thereof. Therefore, when the exposure time as defined above is not longer than the time of the after-glow of the stimulable phosphor, a problem of interference among the picture element signals detected from the stimulable phosphor sheet arises because of the adverse effects of the after-glow.

Further, since each of the sequential picture element signals is obtained as an electric signal of a level corresponding to the integrated light amount obtained by integrating the amount of light sequentially emitted from the stimulable phosphor sheet for a predetermined time (i.e. the time required for the stimulating rays to move a distance corresponding to the size of the picture element, or the sampling period). Therefore, also when the time required for the integration to be conducted for one picture element is not longer than the time for which the after-glow substantially exists, a problem of interference among the picture element signals arises because of the adverse effect of the after-glow.

The present invention is utilized advantageously when interference among the picture element signals is generated as described above. Determination of the time for which the after-glow substantially exists, and judgment of the application of the present invention on the basis of a comparison of the length of the after-glow time with the length of the aforesaid exposure time or with the length of the time required for integration to be conducted for one picture element can be achieved depending on the degree of the adverse effect of the interference on the finally reproduced visible image.

The electrical correction can be achieved analogwise or digitally by use of various circuits as described later. The electrical correction may be conducted at any point of time after the light emitted from the stimulable phosphor sheet is photoelectrically detected and converted to the picture element signals. For example, the electrical correction may be conducted before or after the picture element signals are stored in a memory. Or, the correction may be carried out just before a visible image is finally reproduced by use of the picture element signals. Also, the correction may be conducted just prior to the other image processings, or as a part of the image processings by use of a composite circuit for the correction and image processings.

In the method of the present invention, interference among the signals of the respective picture elements which is caused by the light emission response characteristics of the stimulable phosphor is eliminated electrically. Therefore, in an apparatus wherein the method of the present invention is employed, it is possible to change the manner in which the electrical correction is effected according to the kind of the stimulable phosphor or according to the scanning speed of the stimulating rays.

In the present invention, the stimulable phosphor sheet need not necessary be in the so-called sheet-like form. Further, scanning with the stimulating rays is not limited to linear one-dimensional scanning. For example, it may be raster scanning or curvilinear scanning. Also, the stimulating rays need not be emitted continuously but may instead be emitted pulse-wise.

The present invention will hereinafter be described in further detail.

When a signal correctly representing the radiation image stored on a main scanning line in the stimulable phosphor sheet is expressed by T(x) wherein x is the distance from the start point of the main scanning, and the detected radiation image signal obtained by scanning the stimulable phosphor sheet with stimulating rays along the aforesaid main scanning line and photoelectrically detecting the light sequentially emitted from the stimulable phosphor sheet in the pattern of the aforesaid radiation image is expressed by S(x), it is presumed that there is a relationship as described below between the correct radiation image signal T(x) and the detected radiation image signal S(x).

In the case wherein a stimulable phosphor exhibiting a slow response to the stimulation is used in the stimulable phosphor sheet or a high scanning speed of the stimulating rays is employed for the scanning of the stimulable phosphor sheet, the problem as described below arises. Namely, when the light beam of the scanning stimulating rays is positioned at a scanning point (picture element) $x_0$, the light emitted from scanning points $x_{-1}, x_{-2}, x_{-3}, \ldots, x_{-n}$ scanned before the scanning of the scanning point $x_0$ is also detected together with the light emitted from the scanning point $x_0$.

Therefore, when the read-out is conducted, detected radiation image signals $S(x_0)$, $S(x_{-1})$, $S(x_{-2})$, $S(x_{-3})$, ..., $S(x_{-n})$ of a plurality of adjoining picture elements interfere with one another. Therefore, the radiation image represented by the correct radiation image signal $T(x_0)$ is not obtained, but instead a blurred image having a low sharpness is obtained. In order to determine the correct radiation image signal $T(x_0)$ by use of the detected radiation image signals $S(x_0)$, $S(x_{-1})$, $S(x_{-2})$, $S(x_{-3})$, ..., $S(x_{-n})$, various formulae can be applied depending on how the after-glow decays. For example, when the after-glow exponentially decays with time and, in addition, when the time required for the intensity of the light emission of the stimulable phosphor to reach the maximum after the exposure to the stimulating rays is started is very short compared with the time required for the after-glow to decay sufficiently, the aforesaid read-out is equivalent to the observation of the radiation image represented by the signal $T(x)$ by use of a slit $f(x)$ having the spatial distribution represented by the formula of $$f(x) = \begin{cases} 0 & (x > 0) \\ \dfrac{1}{\tau\alpha} e^{\frac{x}{\tau\alpha}} & (x \leq 0) \end{cases} \quad (1)$$

wherein $\alpha$ is the scanning speed of the stimulating rays, and $\tau$ is the life of light emission (i.e. the time required for the intensity of light emission to decrease to $1/e$ after the exposure to the stimulating rays is finished).

That is, between the correct radiation image signal $T(x)$ and the detected radiation image signal $S(x)$, there is the relationship as expressed by the formulae $$S(x) = \int f(x_0 - x) T(x_0) dx_0 \quad (2)$$

and $$T(x) = \int g(x' - x) S(x') dx' \quad (3)$$

wherein $g(x)$ is the kernel function for inverse transformation, i.e. the correction function for obtaining the correct radiation image signal $T(x)$ from the detected radiation image signal $S(x)$.

From the Formulae (1), (2) and (3), there is obtained the correction function $g(x)$ $$g(x) = \delta(x) - \tau\alpha \frac{d}{dx} \delta(x) \quad (4)$$

Introduction of the Formula (4) into the Formula (3) yields $$T(x) = S(x) + \tau\alpha \frac{d}{dx} S(x) \quad (5)$$

Accordingly, in order to obtain the correct radiation image signal $T(x)$ by use of the detected radiation image signal $S(x)$ obtained by the read-out, the product of the differentiated value obtained by the differentiation at the scanning point (x) and $\tau\alpha$ should be added to the detected radiation image signal $S(x)$.

The Formula (5) is obtained when the slit $f(x)$ is assumed to be expressed by the Formula (1). In the case where the stimulable phosphor sheet is scanned with the stimulating rays as in the present invention, it has been found that the correct radiation image signal $T(x)$ can be obtained by adding the differentiated value obtain by the differentiation at the scanning point (x) to the detected radiation image signal $S(x)$.

Besides the aforesaid method wherein the product of the differentiated value (difference value) of the picture element signal photoelectrically read out and a weight factor is added to the picture element signal photoelectrically read out, various methods may be used to obtain the same effect. For example, it is possible to use the generally known processing methods for improving the image sharpness, such as a method using an unsharp mask, a method of subtracting integral multiples of the Laplacian, and a method of using a filter (for example, an inverse filter, a constrained least-squares filter, parametric Wiener filter, maximum entropy filter, a pseudo-inverse filter, or the like).

DESCRIPTION OF THE PREFERRED EMBODIMENTS

The present invention will hereinbelow be described in further detail with reference to the accompanying drawings.

Figure 1:
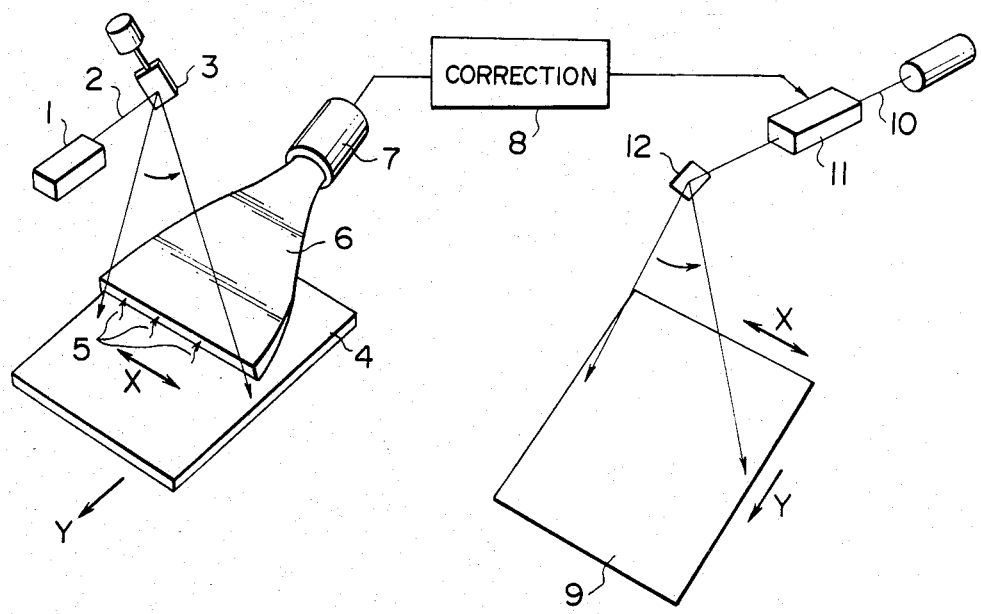
FIG. 1 is a schematic view showing a radiation image read-out and reproducing system wherein an embodiment of the radiation image read-out method in accordance with the present invention is employed.

Referring to FIG. 1, a laser beam 2 (for example, an He-Ne laser beam having a wavelength of 633 nm) emitted from a laser beam source 1 (for example, an He-Ne laser beam source) is one-dimensionally deflected by a light deflector 3 such as a galvanometer mirror and directed onto a stimulable phosphor sheet 4 carrying a radiation image stored therein. The laser beam source 1 is selected so that the laser beam 2 emitted therefrom as the stimulating rays has a wavelength distribution within the stimulation range for the stimulable phosphor of the stimulable phosphor sheet 4. When exposed to the laser beam 2, the stimulable phosphor sheet 4 emits light 5 in an amount proportional to the radiation energy stored therein, and the emitted light enters a light guiding member 6, which may be a light guiding sheet made of a transparent sheet having a thin linear light input face and a ring-shaped light output face. The light input face of the light guiding sheet 6 is positioned close to the scanning line on the stimulable phosphor sheet 4, and the light output face is closely contacted with the light receiving face of a photodetector 7, which may be a photomultiplier. The light guiding sheet 6 is made of a transparent thermoplastic resin sheet such as an acrylic resin sheet so that the light entering from the light input face can be transmitted to the light output face by total reflection through the interior of the light guiding sheet 6. The light emitted from the stimulable phosphor sheet 4 upon stimulation thereof is guided in the interior of the light guiding sheet 6, emitted from the light output face of the light guiding sheet 6 and received by the photodetector 7. The light guiding sheet 6 may be of a shape and a material as disclosed in U.S. Pat. No. 4,346,295. The light receiving face of the photodetector 7 is provided with a filter for transmitting only the light having the wavelength distribution of the light emitted from the stimulable phosphor sheet 4 and cutting off the light having the wavelength distribution of the stimulating rays, so that the photodetector 7 can detect only the light emitted from the stimulable phosphor sheet 4 upon stimulation thereof.

Figure 2A:
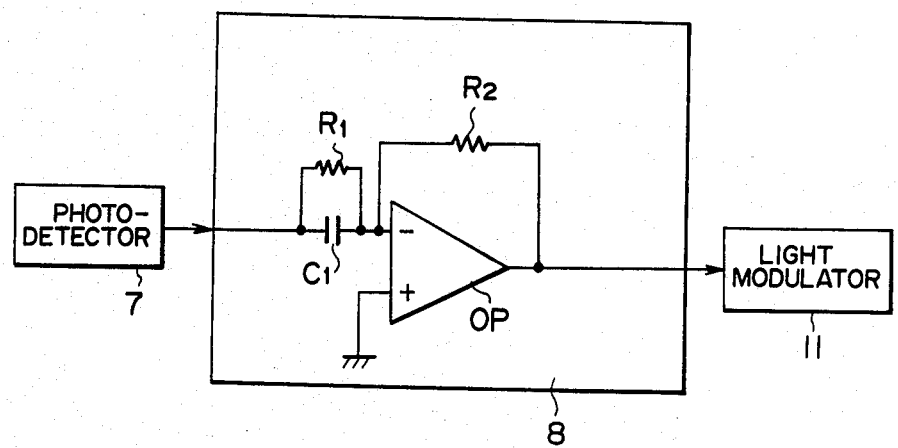
FIGS. 2A and 2B are circuit diagrams showing the embodiments of the radiation image correcting means used in the method of the present invention.
Figure 2B:
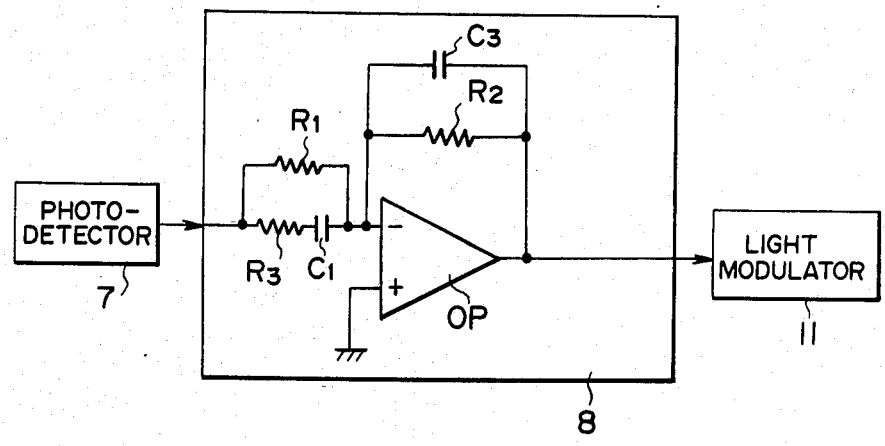

From the photodetector 7 is obtained an electric signal S(x) carrying the radiation image information detected sequentially. The electric signal S(x) is sent to a correcting means 8, wherein the interference among the picture element signals which is caused by the light emission response characteristics of the stimulable phosphor of the stimulable phosphor sheet 4 is eliminated. As the correcting means 8, there should preferably be used a circuit as shown in FIG. 2A which comprises an amplifying circuit composed of an operational amplifier OP, and a differentiating circuit connected in parallel with the amplifier circuit. The amplifying circuit consists of a resistor having a resistance R1, a resistor having a resistance R2 and the operational amplifier OP. The amplification degree G of the amplifying circuit is proportional to R2/R1. The differentiating circuit consists of a capacitor having a capacitance C1, the resistor having the resistance R2 and the operational amplifier OP. However, since the circuit operation of the correcting means shown in FIG. 2A is relatively unstable, there should more preferably be used a circuit as shown in FIG. 2B in which a resistor having a resistance R3 is connected in series with the capacitor having the capacitance C1 and a capacitor having a capacitance C3 is connected in parallel with the resistor having the resistance R2. In each of the circuits shown in FIGS. 2A and 2B, when C1 and R1 are selected so that $\tau = C1R2 \times 1/G = C1R1$, the circuit outputs signals wherein the after-glow components are removed from the signals containing the after-glow components due to the response characteristics of the stimulable phosphor. Therefore, the picture element signals for use in the reproduction of a visible image can be obtained by sampling the signals, which are outputted from the circuit, at predetermined intervals of time regardless of the scanning speed of the stimulating rays. When a radiation image is read out from a stimulable phosphor exhibiting a different value ($\tau$) of light emission life, C1 and R1 should be changed accordingly. The relationship between the operation of the aforesaid circuit and the Formula (5) shown above will now be described below.

The Formula (5) is a spatial differentiation formula. When $x = \alpha t$, then $dx = \alpha dt$. Therefore, the Formula (5) can be converted to the time differentiation formula $$T(\alpha t) = S(\alpha t) + \tau \frac{d}{dt} S(\alpha t) \qquad (6)$$

That is, in the circuit utilizing the Formula (6), the scanning speed ($\alpha$) becomes negligible. Therefore, the circuit may be composed of the amplifying circuit and the differentiating circuit connected in parallel with each other as described above. The electric signal T(x) outputted from the correcting means 8 is used for reproducing a visible image. In FIG. 1, the electric signal T(x) is sent to a light modulator 11 and used to modulate a laser beam 10 for reproducing a visible image. The laser beam 10 is modulated by electric signal T(x) in the light modulator 11 and directed onto a light-sensitive material 9 such as a photographic film via a scanning mirror 12. In this manner, the light-sensitive material 9 is scanned with the modulated laser beam in the direction of the arrow X. At the same time, the light-sensitive material 9 is moved in the direction (of the arrow Y) normal to the scanning direction X in synchronization with the scanning by the laser beam 10. Accordingly, a radiation image having a high sharpness is reproduced in the light-sensitive material 9.

In the embodiment described above, the analog radiation image signals outputted as sequential electric signals from the photodetector 7 are corrected by use of the electric circuit 8 to eliminate the interference among a plurality of the adjoining picture elements of the radiation image. However, it is also possible to use other means for this purpose. For example, in FIG. 1, it is also possible to convert the analog signals outputted from the photodetector 7 into digital signals, and to add a differentiated value (actually, a difference value) of the digital image signal at each picture element to the digital image signal of the picture element obtained thereby.

We claim:

1. A radiation image read-out apparatus including a stimulating ray emitting means for emitting stimulating rays to a stimulable phosphor sheet carrying a radiation image stored therein, a means for moving said stimulable phosphor sheet, and a light detecting means for photoelectrically detecting light emitted from said stimulable phosphor sheet in proportion to the radiation energy stored therein upon exposure thereof to said stimulating rays, thereby to obtain sequential electric signals of respective picture elements of the radiation image, wherein the improvement comprises a means for electrically eliminating the interference among said electric signals of the respective picture elements, which is caused by the light emission response characteristics of the stimulable phosphor of said stimulable phosphor sheet to the stimulation, by adding a weighted difference value of said sequential electric signals of respective picture elements to said sequential electric signals of respective picture elements.

2. An apparatus as defined in claim 1 wherein said means for electrically correcting the interference comprises an amplifying circuit and a differentiating circuit connected in parallel with each other.

3. An apparatus as defined in claim 1 wherein said stimulating rays are laser beams.

4. A radiation image read-out apparatus including a stimulating ray emitting means for emitting stimulating rays to a stimulable phosphor sheet carrying a radiation image stored therein, a means for moving said stimulable phosphor sheet, and a light detecting means for photoelectrically detecting light emitted from said stimulable phosphor sheet in proportion to the radiation energy stored therein upon exposure thereof to said stimulating rays, thereby to obtain sequential electric signals of respective picture elements of the radiation image, wherein the improvement comprises a means for electrically eliminating the interference among said electric signals of the respective picture elements, which is caused by the light emission response characteristics of the stimulable phosphor of said stimulable phosphor sheet to the stimulation, by adding a weighted differentiated value of said sequential electric signals of respective picture elements to said sequential electric signals of respective picture elements.

5. A method of reading out a radiation image in which a stimulable phosphor sheet carrying the radiation image stored therein is scanned with stimulating rays which cause the stimulable phosphor sheet to emit light in proportion to the radiation energy stored therein, and the emitted light is photoelectrically detected to obtain sequential electric signals of respective picture elements of the radiation image, wherein the improvement comprises electrically eliminating the interference among said electric signals of the respective picture elements, which is caused by the light emission response characteristics of said stimulable phosphor to the stimulation, by adding a weighted difference value of said sequential electric signals of respective picture elements to said sequential electric signals of respective picture elements.

6. A method of reading out a radiation image in which a stimulable phosphor sheet carrying the radiation image stored therein is scanned with stimulating rays which cause the stimulable phosphor sheet to emit light in proportion to the radiation energy stored therein, and the emitted light is photoelectrically detected to obtain sequential electric signals of respective picture elements of the radiation image, wherein the improvement comprises electrically eliminating the interference among said electric signals of the respective picture elements, which is caused by the light emission response characteristics of said stimulable phosphor to the stimulation, by adding a weighted differentiated value of said sequential electric signals of respective picture elements to said sequential electric signals of respective picture elements.

* * * * *